Dec. 16, 1958

C. H. BEARE 2,864,130

METHOD OF MOLDING

Filed May 13, 1953

INVENTOR.
Charles H. Beare
BY
Attorney

United States Patent Office 2,864,130
Patented Dec. 16, 1958

2,864,130

METHOD OF MOLDING

Charles H. Beare, Dayton, Ohio, assignor to General Motors Corporation, Detroit, Mich., a corporation of Delaware Application May 13, 1953, Serial No. 354,860

1 Claim. (Cl. 18—59)

This invention relates to molding of curable plastic material and more particularly to a method and mold wherein plastic material is shaped and cured.

An object of the present invention is to provide a method for molding plastic articles whereby the material is shaped in individual molds and maintained under pressure therein during a curing process.

A further object is to provide a method and mold for molding curable plastic material within a mold cavity formed between a pair of sleeves held in nested spaced relation by removable covers when said covers deform portions of the tubes.

It is another object of the present invention to provide a mold for plastic material wherein the material is cured and maintained under pressure while being simultaneously bonded in situ to a metallic sleeve forming a portion of the mold.

It is an object of the present invention to provide a method for molding plastic material between a pair of nested sleeves while simultaneously bonding the material to at least one of said sleeves, said method comprising the steps of providing a pair of nested sleeves in spaced relation to each other, applying and securing covers to the ends of the nested sleeves for maintaining the sleeves in spaced relation while forming a closed annular space between said sleeves, injecting under pressure an uncured plastic material through tapered sprue passages provided in one of the covers, said sprues being constructed and arranged for maintaining said material under pressure within the mold during curing thereof.

In carrying out the above objects another object of the invention is to mold curable plastic material by the method described wherein the material is cured and simultaneously bonded to metal inserts within the mold.

A still further object of the present invention is to cure plastic material and simultaneously bond the material in situ to a metallic part forming a portion of the mold wherein the material is shaped and cured. This object is specifically accomplished by forming a mold comprising; a metallic sleeve and a pair of covers for the ends of this sleeve, adapted for being secured in a predetermined position relative to said sleeve ends wherein one of said covers includes a tapered sprue channel, said sprue channel being adapted for passing injected uncured material into the mold cavity and for maintaining said material within said mold cavity subsequent to the removal of injecting pressure.

In carrying out the above objects, another object of this invention is to provide a mold wherein an annulus of curable plastic material is cured and bonded in situ to a pair of nested concentric sleeves. This object is materialized by providing a pair of spaced concentric tubes each having a predetermined length and providing a pair of covers for the end of said tubes. Each of said covers having a pair of concentric grooves on one surface thereof wherein the tubes are maintained in spaced relation when end portions of one of the tubes are held therein, and providing tapered sprue channels in at least one of the covers constructed and arranged for passing material injected therethrough, and tapered so as to maintain said material under pressure after the injecting pressure is removed.

A still further object of the present invention is to provide a method for molding a curable plastic material within a sleeve while simultaneously bonding the material to a portion of the surface of said sleeve wherein the steps comprise; providing a metallic sleeve and applying covers to the ends of said sleeve for forming a confined mold cavity between said covers and the interior surface of said sleeve, providing a tapered sprue channel in one of said covers leading to said cavity from the exterior of the confining cover, injecting under pressure a plastic curable material through said tapered sprue, said sprue being dimensioned so as to maintain said material under pressure within said cavity while a curing process is conducted for curing the material and simultaneously forming a bond in situ between the material and the metallic sleeve, and finally removing said covers from the sleeve to provide a formed and cured article having a portion of the surface thereof bonded to a metallic sleeve wherein the material is confined.

Further objects and advantages of the present invention will be apparent from the following description, reference being had to the accompanying drawings wherein a preferred embodiment is clearly shown.

Figure 1:
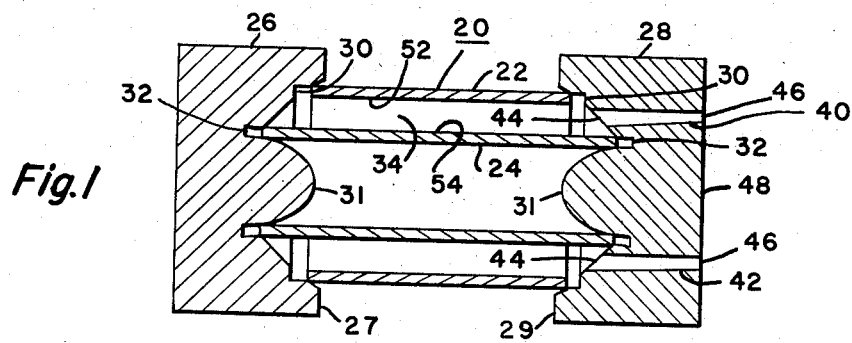
Fig. 1 is a view section showing a pair of nested concentric tubes and covers for the tube ends.
Figure 2:
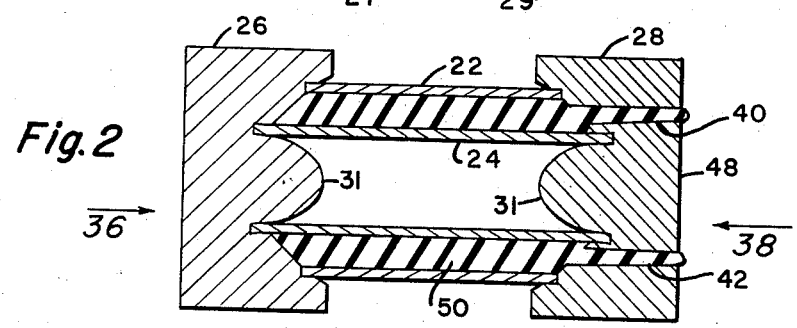
Fig. 2 shows the parts in Fig. 1 in assembled relation to form a mold cavity filled with elastomeric material.

Referring to the drawings and particularly to Fig. 1 the numeral 20 designates a mold the parts of which are shown in partly assembled relation. Mold 20 consists of a pair of concentrically spaced sleeves or tubes 22 and 24 and covers 26 and 28 for ends of the tubes. Covers 26 and 28 each have a pair of concentric grooves 30 and 32 formed on surfaces 27 and 29 respectively which are spaced and adapted after assembly for maintaining the tubes in spaced concentric relation to each other. Thus grooves 30 are suitably located and shaped for positioning tube 22 and grooves 32 have portions thereof slightly outwardly directed as shown in the drawings so as to engage and outwardly deform portions of the ends of the tube 24, which is longer than tube 22, when the covers are forced toward each other by a suitable press (not shown) in the direction as indicated by arrows 36 and 38 in Fig. 2.

When the covers are in position, an annular closed space or cavity 34 will be formed between tubes 22 and 24 and covers 26 and 28. It is manifest that tube 24, when outwardly flared in groove 32, will securely lock covers 26 and 28 to the respective ends and thus form the composite mold 20. To aid in the location of tube 24 within deforming grooves 32, a rounded projection 31 is provided on surfaces 27 and 29 of covers 26 and 28. The sides of the projection 31 are tapered for engaging the inner surfaces of tube 24 and will direct the ends of tube 24 into position in grooves 32 as the tube 24 is brought into deforming and subsequent locking relation with covers 26 and 28 so as to form a composite mold that may be filled in any suitable manner as through apertures of suitable shape and size in the cover or in the sleeves.

Tapered sprue channels 40 and 42 provided in covers 28 are radially located and extend through cover 28 to mold cavity 34. The taper of the sprues is such that the portion of larger diameter 44 is adjacent the mold cavity and the portion of smaller diameter 46 is remote therefrom and located at the external surface 48 of the cover 28. Thus, when the uncured plastic material 50 is injected by a suitable injecting means (not shown) through one of the sprues, for example sprue 42, the air entrapped within the cavity 34 may escape through the other sprue 40, until the entire mold cavity 34 is filled with the material 50.

The tapered construction of the sprues 40 and 42 is important to the success of the present invention. The portion of larger diameter 44 being adjacent the mold cavity 34 and the portion of smaller diameter remote therefrom permits an easy access for the material into the mold cavity during the filling cycle. After cavity 34 is filled, an efficient friction surface is presented to the filling material 50 under pressure, and the frictional characteristics of the material in combination with the degree of taper of the sprue provides an effective dam against any appreciable outward flow of material 50 from cavity 34, after mold 20 is removed from the press or injecting apparatus (not shown).

Figure 3:
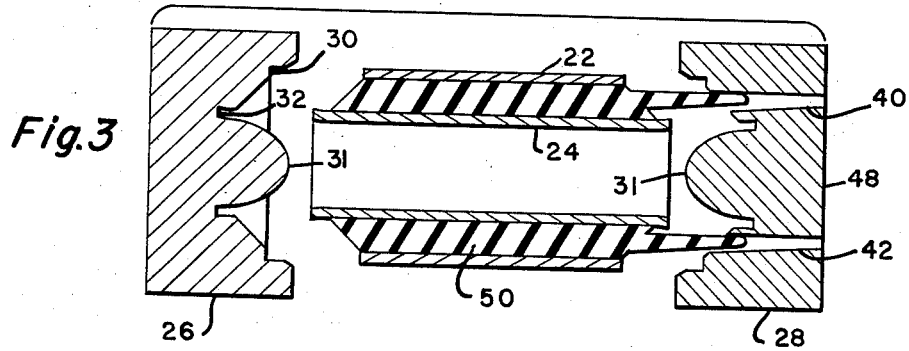
Fig. 3 is an expanded sectional view which shows the parts in Fig. 2 wherein the covers have been removed from a formed composite article.

After the mold 20 has been completely filled with elastomeric material 50, it is removed from the injecting press and placed in a retort or other suitable heating apparatus (not shown) wherein the material 50 is cured by some suitable process as vulcanization. If desired the material may be bonded in situ during the curing to the surfaces 52 of tube 22 and surface 54 of tube 24 providing said surfaces have been suitably prepared. At the conclusion of the cure the mold is removed from the heating apparatus and the end covers 26 and 28 are removed from the tubes 22 and 24 to provide a cured annulus 50 (Fig. 3). In Fig. 3 a rubberlike annulus is used in connection with metallic sleeves such as are used in automotive spring shackles, etc. Further the metallic portions of the sleeve may be suitably worked as by swaging to form a spring shackle bushing as shown in the Patent 1,983,796 to Harvey D. Geyer, that is assigned to the assignee of the present invention and the ends of the sleeves swaged so as to bring the plastic material into any desired state of compression.

Figure 4:
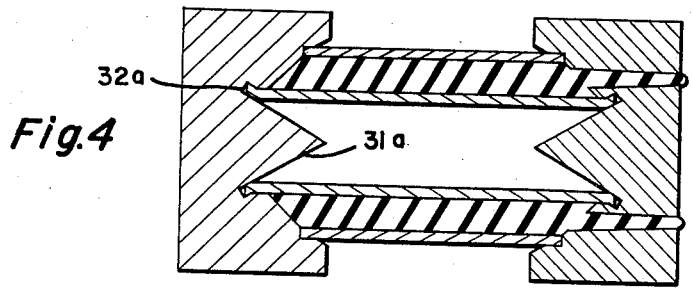
Fig. 4 shows a modification of the parts as shown in Fig. 2.

In Fig. 4 one modification of the present invention is shown. In this embodiment a cone shaped projection 31A is used in place of the rounded projection 31 and the grooves 32A is more sharply outwardly inclined than grooves 32 of the preceding embodiment. The grooves 32A will increase the deformation of the tubes as the covers 26 and 28 are pressed into position on the tubes and will thus increase the locking engagement between the tubes and covers and thereby permit higher locking pressures to be utilized if desired.

It is apparent covers 26 and 28 are not appreciably affected during the steps outlined above and are suitable for reuse in the method heretofore fully described. The method and mold as disclosed is adapted to the molding of any suitable plastic material curable at normal curing temperatures. In this connection well known organic plastics either of the thermosetting or thermoplastic types, natural rubber, butadiene-styrene copolymers, butadiene-acrylonitrile copolymers, reclaimed rubber, polychloroprene, etc., or compatible mixtures of any of the aforementioned may be used, after they are properly compounded, so that a cure may be accomplished by heating for a predetermined period. The particular compound used in the method is of no importance; the basic features of the invention being directed to a method and mold wherein the material is held therein during the molding and curing by the taper of a sprue without employing a valve or maintaining pressure at the sprue. Further the mold is held together during the same period without the use of a conventional molding press, or mold clamps heretofore required. The mold formed according to the above may be formed to have a single cavity within a single tube or a plurality of cavities if more tubes are used and may be placed in a rack, basket, or in any other suitable conveyor within the heating apparatus during the cure.

Further it is apparent that the plastic material may be bonded to any of these surfaces to which it is in contact if suitable well known methods for bonding are followed. The adherence of the elastomeric material with any of the parts may also be eliminated, if proper coatings thereon are employed.

While the embodiments of the present invention constitute preferred forms, it is to be understood that other forms might be adopted.

What is claimed is as follows:

In a method for molding vulcanizable elastomeric material and simultaneously bonding said material to surfaces of a pair of nested concentrically disposed metallic tubes, the steps comprising; placing a first imperforate cover and a second cover over the respective ends of the concentric tubes, said covers having concentric annular grooves thereon for maintaining said tubes in spaced relationship while deforming a portion of the ends of at least one of said tubes for securing said tube to the cover, said second cover having first and second openings tapered to prevent any appreciable outward flow of material therethrough and connecting the annular space between said tubes, the exterior of said cover with the taper of the openings extending in such a direction that the openings having a larger cross-section on the side of the cover located immediately adjacent the end of the annular space defined by the concentric tubes, applying pressure to the covers so as to deform the ends of a tube thereby forming an assembly having an annular mold cavity between the covers and the annular space between concentric tube surfaces, placing the assembly in injecting apparatus and injecting a quantity of vulcanizable elastomeric material under pressure into said cavity through said first tapered opening while simultaneously venting air from said cavity through said second tapered opening and continuing the injection until a quantity of elastomeric material is forced outwardly through said second opening upon complete filling of the cavity, transferring said assembly from said injecting apparatus to vulcanizing apparatus, heating said assembly in said vulcanizing apparatus for vulcanizing the elastomeric material therein for causing the material to bond in situ to the tube surfaces, removing said assembly from said vulcanizing apparatus, and finally removing said covers from the ends of the tubes to provide a unitary assembly of nested metallic tubes maintained in concentric spaced relation by an elastomeric tubular member having surfaces bonded to contacting surfaces of the metallic tubes.

References Cited in the file of this patent

UNITED STATES PATENTS

| | | |
|---|---|---|
| 1,161,756 | Wolever | Nov. 23, 1915 |
| 2,233,110 | Piron | Feb. 25, 1951 |
| 2,426,651 | Stacy | Sept. 2, 1942 |
| 2,327,113 | Krotz | Aug. 17, 1943 |
| 2,724,864 | Krotz | Nov. 29, 1955 |
| 2,409,486 | Hagen | Oct. 15, 1946 |
| 2,498,489 | Haggart | Feb. 21, 1951 |